(12) United States Patent
Zhu et al.

(10) Patent No.: US 12,580,853 B2
(45) Date of Patent: Mar. 17, 2026

(54) METHOD AND DEVICE FOR PROCESSING DATA PACKET, STORAGE MEDIUM, AND ELECTRONIC DEVICE

(71) Applicant: ZTE Corporation, Shenzhen (CN)

(72) Inventors: Xiaolong Zhu, Shenzhen (CN); Zheng Zhang, Shenzhen (CN); Jun Feng, Shenzhen (CN); Yong Chen, Shenzhen (CN); Rusheng Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 461 days.

(21) Appl. No.: 18/018,905

(22) PCT Filed: Jan. 22, 2021

(86) PCT No.: PCT/CN2021/073373
§ 371 (c)(1),
(2) Date: Jan. 31, 2023

(87) PCT Pub. No.: WO2022/021818
PCT Pub. Date: Feb. 3, 2022

(65) Prior Publication Data
US 2023/0291682 A1     Sep. 14, 2023

(30) Foreign Application Priority Data

Jul. 31, 2020    (CN) ......................... 202010761880.X

(51) Int. Cl.
*H04L 45/50* (2022.01)
*H04L 47/125* (2022.01)

(52) U.S. Cl.
CPC ............ *H04L 45/50* (2013.01); *H04L 47/125* (2013.01)

(58) Field of Classification Search
CPC ....... H04L 45/50; H04L 47/125; H04L 45/04; H04L 45/586; H04L 45/16; H04L 45/507
See application file for complete search history.

(56) References Cited

U.S. PATENT DOCUMENTS

| | | | |
|---|---|---|---|
| 9,544,240 B1 * | 1/2017 | Przygienda | ......... H04L 12/1863 |
| 2011/0153827 A1 * | 6/2011 | Yengalasetti | ....... H04W 80/045 718/105 |

(Continued)

FOREIGN PATENT DOCUMENTS

| | | |
|---|---|---|
| CN | 106656524 A | 5/2017 |
| CN | 110650094 A | 1/2020 |

(Continued)

OTHER PUBLICATIONS

International Search Report for corresponding application PCT/CN2021/073373 filed Jan. 22, 2021; Mail date May 6, 2021.

(Continued)

*Primary Examiner* — Chris Parry
*Assistant Examiner* — Dixon F Dabipi
(74) *Attorney, Agent, or Firm* — CANTOR COLBURN LLP

(57) ABSTRACT

Provided in the embodiments of the present disclosure are a method and device for processing a data packet, a storage medium, and an electronic device. The method includes: in a case where a Bit-Forwarding Ingress Router (BFIR) performs Bit Index Explicit Replication (BIER) packet encapsulation and outer Internet Protocol Version 6 (IPv6) packet encapsulation on a data packet, copying an Entropy field in a BIER packet header to a position of a Flow Label field of an outer IPv6 packet, and placing a label value allocated for Virtual Private Network (VPN) data in a position of the original Entropy field in the BIER packet header; and setting a data packet after the BIER packet header, and setting a (Continued)

Input/output device 108
Transmission device 106
Processor 102
Memory 104

Proto field in the BIER packet header to a corresponding value indicating a data packet type of the data packet.

10 Claims, 4 Drawing Sheets

(56) References Cited

U.S. PATENT DOCUMENTS

| | | | | |
|---|---|---|---|---|
| 2015/0131658 A1* | 5/2015 | Wijnands | | H04L 45/7453 |
| | | | | 370/392 |
| 2015/0131660 A1* | 5/2015 | Shepherd | | H04L 45/74 |
| | | | | 370/390 |
| 2016/0142248 A1* | 5/2016 | Thubert | | H04W 40/24 |
| | | | | 370/392 |
| 2018/0287935 A1* | 10/2018 | Wang | | H04L 12/4625 |
| 2018/0367456 A1 | 12/2018 | Wijnands | | |
| 2019/0296999 A1* | 9/2019 | Dutta | | H04L 12/1854 |
| 2020/0412562 A1* | 12/2020 | Peng | | H04L 45/16 |
| 2021/0266189 A1* | 8/2021 | Xie | | H04L 12/4641 |
| 2021/0306251 A1* | 9/2021 | Mahadevan | | H04L 49/201 |

FOREIGN PATENT DOCUMENTS

| | | | |
|---|---|---|---|
| CN | 111147383 A | 5/2020 | |
| WO | 2016198016 A2 | 12/2016 | |
| WO | 2018171359 A1 | 9/2018 | |
| WO | WO-2019128621 A1 * | 7/2019 | ............. H04L 45/04 |

OTHER PUBLICATIONS

Jinghai Yu, New Multicast Technology (BIER) and Prototype System, Telecommunications Science, No. 11, Nov. 30, 2019.

Rosen, Ed., "Multicast VPN Using Bit Index Explicit Replication (BIER)", Internet Engineering Task Force (IETF), Apr. 2018, 17 pages.

Wijnands et al, "Encapsulation for Bit Index Explicit Replication (BIER) in MPLS and Non-MPLS Networks RFC 8296" last updated Feb. 22, 2019, Retrieved Mar. 12, 2024, 16 pages.

Zhang et al, BIER in IPV6(BIERin6) draft-zhang-bier-bierin6-07, last updated Jul. 30, 2020, Retrieved Mar. 12, 2024, 6 pages.

* cited by examiner

Fig. 1

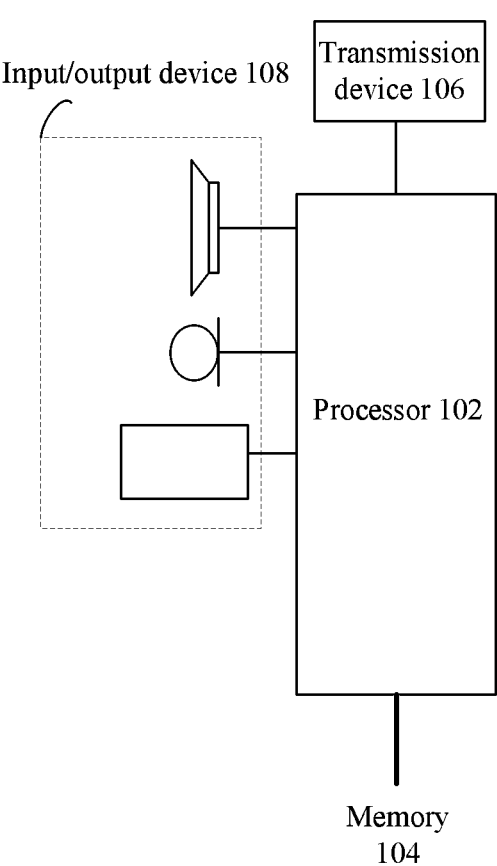

Input/output device 108

Transmission device 106

Processor 102

Memory
104

Fig. 2

In a case where a Bit-Forwarding Ingress Router (BFIR) performs Bit Indexed Explicit Replication (BIER) packet encapsulation and outer Internet Protocol Version 6 (IPv6) packet encapsulation on a data packet, copying an Entropy field in a BIER packet header to a position of a Flow Label field of an outer IPv6 packet, and placing a label value allocated for Virtual Private Network (VPN) data in a position of the original Entropy field in the BIER packet header ⌐ S202

Setting a data packet after the BIER packet header, and setting a Proto field in the BIER packet header to a corresponding value indicating a data packet type of the data packet, wherein the data packet type at least comprises one of: an IPv4 packet, an IPv6 packet, an Ethernet packet, an MPLS packet and an OAM packet ⌐ S204

Fig. 3

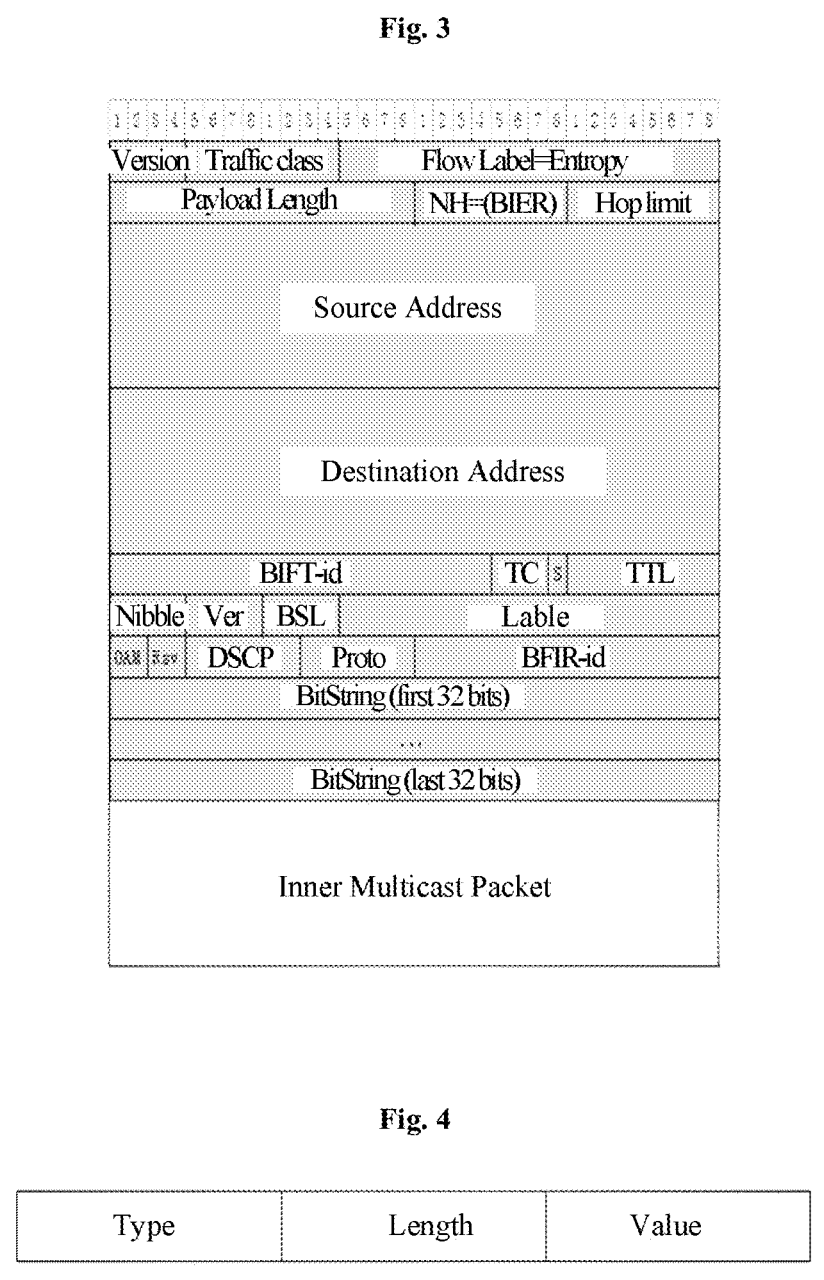

| 1 2 3 4 5 6 7 8 | 1 2 3 4 5 6 7 8 | 1 2 3 4 5 6 7 8 | 1 2 3 4 5 6 7 8 |
|---|---|---|---|
| Version | Traffic class | Flow Label=Entropy | |
| Payload Length | | NH=(BIER) | Hop limit |
| Source Address | | | |
| Destination Address | | | |
| BIFT-id | | TC | s | TTL |
| Nibble | Ver | BSL | Lable |
| 888 | 889 | DSCP | Proto | BFIR-id |
| BitString (first 32 bits) | | | |
| … | | | |
| BitString (last 32 bits) | | | |
| Inner Multicast Packet | | | |

Fig. 4

| Type | Length | Value |
|---|---|---|

| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|---|---|---|---|---|---|---|---|---|---|---|---|---|---|---|
| Version | | | | Traffic Class | | | | | | | | Flow Label | | | | | | | | | | | | | | | | | | | |
| Payload Length | | | | | | | | | | | | NH = (BIER) | | | | | | | | Hop Limit | | | | | | | | | | | |
| Source Address | | | | | | | | | | | | | | | | | | | | | | | | | | | | | | | |
| Destination Address | | | | | | | | | | | | | | | | | | | | | | | | | | | | | | | |
| BIFT-id | | | | | | | | | | | | | | | | TC | | | S | TTL | | | | | | | | | | | |
| Nibble | | | | Ver | | | | BSL | | | | Entropy | | | | | | | | | | | | | | | | | | | |
| OAM | Rsv | | | DSCP | | | | Proto=MPLS | | | | BFIR-id | | | | | | | | | | | | | | | | | | | |
| BitString (first 32 bits) | | | | | | | | | | | | | | | | | | | | | | | | | | | | | | | |
| ... | | | | | | | | | | | | | | | | | | | | | | | | | | | | | | | |
| BitString (last 32 bits) | | | | | | | | | | | | | | | | | | | | | | | | | | | | | | | |
| label | | | | | | | | | | | | | | | | | | | | | | | | | | | | | | | |
| Inner Multicast Packet | | | | | | | | | | | | | | | | | | | | | | | | | | | | | | | |

METHOD AND DEVICE FOR PROCESSING DATA PACKET, STORAGE MEDIUM, AND ELECTRONIC DEVICE

CROSS REFERENCE

This application is a National Stage Filing of the PCT International Application No. PCT/CN2021/073373 filed on Jan. 22, 2021, which claims priority to Chinese Patent Application No. 202010761880.X filed on Jul. 31, 2020, the entirety of which is herein incorporated by reference.

TECHNICAL FIELD

Embodiments of the present disclosure relate to the field of communications, and in particular, to a method and device for processing a data packet, a storage medium, and an electronic device.

BACKGROUND

Internet Protocol Version 6 (IPv6) is a next generation IP protocol, designed by the Internet Engineering Task Force (IETF), for replacing Internet Protocol Version 4 (IPv4). The use of IPv6 can not only solve the problem concerning the number of network address resources, but also solve the obstacle of connecting various access devices to the Internet.

Bit Index Explicit Replication (BIER) (RFC8279) is a novel multicast data forwarding technology. According to the BIER technology, each node at a network edge is represented by only one bit, multicast traffic is transmitted in an intermediate network, a specific BIER packet header, which labels all destination nodes of the multicast traffic in the form of a bit string, is additionally encapsulated in the multicast traffic, and the forwarding node in the intermediate network performs routing according to the bits in the bit string, thereby guaranteeing that the multicast traffic can be sent to all the destination nodes. The forwarding device of the intermediate node forms a Bit Index Forwarding Table (BIFT) table for guiding BIER forwarding in advance based on a routing protocol, such as an Open Shortest Path First (OSPF) protocol and an Intermediate System-to-Intermediate System (ISIS) protocol in a three-layer network. When receiving traffic encapsulated with a BIER packet header, the forwarding device of the intermediate node forwards the packet to the destination node(s) according to the BIFT. Because there is no multicast tree establishment problem in the BIER data plane forwarding technology, a delay caused by establishment of the multicast tree is eliminated, and when a link or node problem occurs in the network, convergence speed is the same as an OSPF or ISIS protocol, which reduces a huge delay compared with original multicast tree reestablishment.

During transmission based on the BIER technology, it is only needed to encapsulate a certain piece of multicast traffic in a BIER packet as a payload for transmission. An ingress device (Bit-Forwarding Ingress Router, short as BFIR) in the BIER domain needs to know which egress devices (Bit-Forwarding Egress Routers, short as BFERs) in the BIER domain need the multicast traffic, so that after receiving the multicast traffic, the BFER can forward the multicast traffic to a multicast receiver, that needs to receive the multicast traffic, outside the BIER domain. The BIER technology can be directly encapsulated in an Ethernet packet for transmission (protocol number 0xAB37), and when certain nodes cannot support direct recognition of the Ethernet packet, if transmission is still performed in the form of the Ethernet packet, a node which cannot correctly recognize the Ethernet packet will become a black hole which discards the Ethernet packet.

Aiming at the problem in the related art concerning how to optimize a BIER packet in an IPv6 packet, no effective solution has been proposed.

SUMMARY

The embodiments of the present disclosure provide a method and device for processing a data packet, a storage medium, and an electronic device, which may at least solve the problem in the related art concerning how to optimize a BIER packet in an IPv6 packet.

According to an embodiment of the present disclosure, provided is a method for processing a data packet, including: in a case where a Bit-Forwarding Ingress Router (BFIR) performs Bit Index Explicit Replication (BIER) packet encapsulation and outer Internet Protocol Version 6 (IPv6) packet encapsulation on a data packet, copying an Entropy field in a BIER packet header to a position of a Flow Label field of an outer IPv6 packet, and placing a label value allocated for Virtual Private Network (VPN) data in a position of the original Entropy field in the BIER packet header; and setting a data packet after the BIER packet header, and setting a Proto field in the BIER packet header to a corresponding value indicating a data packet type of the data packet, wherein the data packet type at least includes one of: an Internet Protocol Version 4 (IPv4) packet, an IPv6 packet, an Ethernet packet, a Multi-Protocol Label Switching (MPLS) packet and an Operation Administration and Maintenance (OAM) packet.

According to another embodiment of the present disclosure, provided is a device for processing a data packet, including: a processing module, configured to, in a case where a Bit-Forwarding Ingress Router (BFIR) performs Bit Index Explicit Replication (BIER) packet encapsulation and outer Internet Protocol Version 6 (IPv6) packet encapsulation on a data packet, copy an Entropy field in a BIER packet header to a position of a Flow Label field of an outer IPv6 packet, and place a label value allocated for Virtual Private Network (VPN) data in a position of the original Entropy field in the BIER packet header; and a setting module, configured to set a data packet after the BIER packet header, and set a Proto field in the BIER packet header to a corresponding value indicating a data packet type of the data packet, wherein the data packet type at least includes one of: an Internet Protocol Version 4 (IPv4) packet, an IPv6 packet, an Ethernet packet, a Multi-Protocol Label Switching (MPLS) packet and an Operation Administration and Maintenance (OAM) packet.

According to another embodiment of the present disclosure, provided is a computer-readable storage medium. The computer-readable storage medium stores a computer program, wherein the computer program, when being executed, is configured to execute the operations in any one of the method embodiments when running.

According to another embodiment of the present disclosure, provided is an electronic device, including a memory and a processor, wherein the memory stores a computer program, and the processor is configured to run the computer program so as to execute the operations in any one of the method embodiments.

By means of the embodiments of the present disclosure, the following processing can be performed on a BIER packet and an IPv6 packet: copying an Entropy field in a BIER packet header to a position of a Flow Label field of an outer IPv6 packet, and placing a label value allocated for VPN data in a position of the original Entropy field in the BIER packet header; and setting a data packet after the BIER packet header, and setting a Proto field in the BIER packet header to a corresponding value indicating a data packet type of the data packet, so that the BIER packet is encapsulated in an IPv6 packet. In addition, the field definition of a Differentiated Services Code Point (DSCP) field may also be similarly changed. By means of the technical solution, the problems in the related art that a BIER packet cannot be effectively optimized in an IPv6 packet are solved.

BRIEF DESCRIPTION OF THE DRAWINGS

FIG. 1 is a hardware structure block diagram of a computer terminal for implementing a method for processing a data packet according to the embodiments of the present disclosure;

FIG. 2 is a flowchart of a method for processing a data packet according to the embodiments of the present disclosure;

FIG. 3 is a schematic diagram (I) of encapsulating a BIER packet in an IPv6 packet according to the embodiments of the present disclosure;

FIG. 4 is a schematic diagram of a TLV according to the embodiments of the present disclosure;

DETAILED DESCRIPTION

Figures 5, 6:
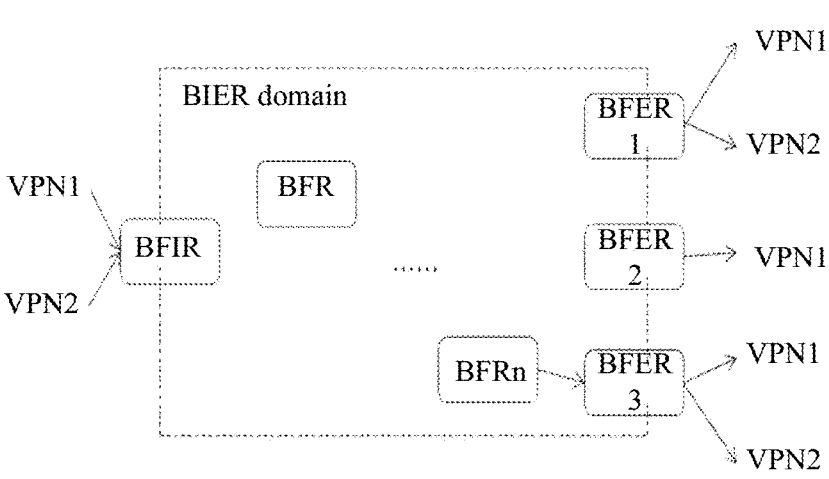
FIG. 5 is a schematic diagram of a mechanism for transmitting a BIER packet in the BIER domain according to the embodiments of the present disclosure.
FIG. 6 is a schematic diagram (II) of encapsulating a BIER packet in an IPv6 packet according to the embodiments of the present disclosure.

Embodiments of the present disclosure will be described below in detail with reference to the accompanying drawings and in conjunction with embodiments.

It should be noted that terms "first", "second", and the like in the description, claims, and drawings of the present disclosure are used to distinguish similar objects, and are not necessarily used to describe a specific sequence or order.

The method embodiments provided in the embodiments of the present disclosure may be executed in a computer terminal or a similar computing device. By taking running on a computer terminal as an example, FIG. 1 is a hardware structure block diagram of a computer terminal for implementing a method for processing a data packet according to the embodiments of the present disclosure. As shown in FIG. 1, the computer terminal may include one or more (only one is shown in FIG. 1) processors 102 (the one or more processors 102 may include, but are not limited to, processing devices such as a Microcontroller Unit (MCU) or a Field-Programmable Gate Array (FPGA)), and a memory 104 configured to store data. The computer terminal may further include a transmission device 106 configured to perform communication functions and an input/output device 108. A person having ordinary skill in the art may understand that, the structure shown in FIG. 1 is merely exemplary and does not limit the structure of the foregoing computer terminal. For example, the computer terminal may further include more or fewer components than shown in FIG. 1, or have a different configuration from that shown in FIG. 1.

The memory 104 may be configured to store a computer program, for example, a software program and modules of application software, such as a computer program corresponding to the method for processing the data packet in the embodiments of the present disclosure. The processor 102 executes various function applications and data processing by running the computer program stored in the memory 104, thereby implementing the foregoing method. The memory 104 may include high-speed random access memory, and may also include non-volatile memory, such as one or more magnetic storage devices, flash memory, or other non-volatile solid-state memory. In some examples, the memory 104 may further include memory remotely located with respect to the processor 102, which may be connected to a computer terminal over a network. Examples of such networks include, but are not limited to, the Internet, intranets, local area networks, mobile communication networks, and combinations thereof.

The transmission device 106 is configured to receive or transmit data via a network. Specific examples of the described network may include a wireless network provided by a communication provider of the computer terminal. In one example, the transmitting device 106 may include a Network Interface Controller (NIC) that may be coupled to other network devices via a base station to communicate with the Internet. In an example, the transmission device 106 may be a Radio Frequency (RF) module configured to communicate with the Internet in a wireless manner.

In the related art, the multicast technology is being more and more applied in the Internet, such as multi-party conference, remote education, remote medicine, and live network. With the deployment of IPv6, it has become necessary for multicast data packets to traverse the IPv6 network, and for some nodes incapable of directly supporting the processing of BIER Ethernet encapsulation packets, it has become a necessary function for these nodes to encapsulate the BIER in the IPv6 header.

The embodiments of the present disclosure put forward a new packet encapsulation mode in which the BIER encapsulation and the IPv6 encapsulation are combined, and definition of a repeated part of fields in the BIER encapsulation and the IPv6 encapsulation is changed. In combination with a capability announcement of a control plane, an encapsulation and processing flow of a packet are optimized without affecting any function.

The embodiments provide a method for processing a data packet that is implemented on the computer terminal. FIG. 2 is a flowchart of a method for processing a data packet according to the embodiments of the present disclosure. As shown in FIG. 2, the flow includes the following operations.

At S102, in a case where a BFIR performs BIER packet encapsulation and outer IPv6 packet encapsulation on a data packet, an Entropy field in a BIER packet header is copied to a position of a Flow Label field of an outer IPv6 packet, and a label value allocated for VPN data is placed in a position of the original Entropy field in the BIER packet header.

At S104, a data packet is set after the BIER packet header, and a Proto field in the BIER packet header is set to a corresponding value indicating a data packet type of the data packet, wherein the data packet type at least includes one of: an IPv4 packet, an IPv6 packet, an Ethernet packet, an MPLS packet and an OAM packet.

By means of the embodiments of the present disclosure, the following processing can be performed on a BIER packet and an IPv6 packet: copying an Entropy field in a BIER packet header to a position of a Flow Label field of an outer IPv6 packet, and placing a label value allocated for VPN data in a position of the original Entropy field in the BIER packet header; and setting a data packet after the BIER packet header, and setting a Proto field in the BIER packet header to a corresponding value indicating a data packet type of the data packet, so that the BIER packet is encapsulated in an IPv6 packet. By means of the technical solution, the problems in the related art that a BIER packet cannot be effectively optimized in an IPv6 packet are solved.

The entity for performing the foregoing operations may be, but is not limited to, a base station or a terminal.

The execution order of the operation S102 and the operation S104 may be interchanged, that is, the operation S104 may be executed first, and then the operation S102 is executed.

By applying the technical solution of the operation S102 to the operation S104, as shown in FIG. 3, in this case, even for a service based on a VPN, the Proto field is no longer set as an MPLS type, but is directly set as the real type of the data packet, that is, IPv4, IPv6, Ethernet, MPLS or OAM, etc.

In an exemplary embodiment, after the field setting in operations S102-S104 is completed, the Entropy field in the BIER packet header has been copied to the position of the Flow Label field of the outer IPv6 packet, and the method may further include the following operation. When performing forwarding processing on the data packet, a device that needs to process the data packet performs load balancing processing only according to the Flow Label field in the IPv6 packet header. It can be understood that when forwarding processing is performed on devices along the route, load balancing processing is performed only according to the Flow Label field in the IPv6 packet header, in other words, the load balancing processing is no longer performed according to the Entropy field in the BIER packet header.

In an exemplary embodiment, the method may further include the following operations. When receiving the data packet, a Bit-Forwarding Egress Router (BFER) removes the outer IPv6 packet header from the data packet, and searches for a VPN corresponding to the label value according to the label value in the original Entropy field in the BIER packet header; and performs forwarding processing on the data packet according to the data packet type indicated in the Proto field. That is, in the embodiment of the present disclosure, when receiving the packet, the BFER removes the outer IPv6 header, finds the corresponding VPN according to the original Entropy field (which is now the Label field) in the BIER packet header, and then directly reads and forwards the subsequent data packet according to the indication of the Proto field. Assuming that the Proto field indicates IPv4, the BFER performs IPv4 routing table lookup processing in a corresponding VPN, and forwards the data packet to a correct receiver.

It should be noted that, the value of Entropy being 0 may indicate a global multicast, that is, the VPN is 0 or there is no VPN, and in this case, the corresponding global routing table may be searched according to the Proto field.

Concerning field definition change processing for packets at the BFIR and the BFER, if the devices all support and only support the field definition change processing, such a parsing method is adopted as long as the BIER packet is encapsulated into the IPv6 header, and no other control means is required. However, some devices deployed in the network may not support the field definition change processing, and therefore there may be a case where both of the field definition change processing and normal processing are supported. In this case, a control plane needs to be extended, for example, in the following manner.

In an exemplary embodiment, the method may further include: for a pure intermediate node which is neither a BFIR nor a BFER, in a case where the intermediate node performs load balancing processing only according to the Flow Label in the IPv6 packet header, a processing procedure of capability negotiation and announcement between the BFIR and the BFER is performed.

In an exemplary embodiment, the method may further include: capability negotiation information in the processing procedure of capability negotiation and announcement is defined in a form of Type Length and Value (TLV).

In an exemplary embodiment, the operation that the capability negotiation information in the processing procedure of capability negotiation and announcement is defined in the form of TLV may at least include one of: setting Type in the TLV as 1, Length in the TLV as 1 byte, and Value in the TLV as 1 to indicate that the Entropy field in the BIER packet header has been copied to the position of the Flow Label field of the outer IPv6 packet and the label value allocated for the VPN data has been placed in the position of the original Entropy field in the BIER packet header; or setting Type in the TLV as 1, Length in the TLV as 0, and Value in the TLV as null to indicate that the Entropy field in the BIER packet header has been copied to the position of the Flow Label field of the outer IPv6 packet and the label value allocated for the VPN data has been placed in the position of the original Entropy field in the BIER packet header.

In an exemplary embodiment, the method may further include one of: setting Type in the TLV as 2, Length in the TLV as 1 byte, and Value in the TLV as 1 to indicate that a Differentiated Services Code Point (DSCP) field in the BIER packet header has been copied to a position of a Traffic Class field or other field of the outer IPv6 packet, and the original DSCP field in the BIER packet header may be used for other purposes; or setting Type in the TLV as 2, Length in the TLV as 0, and Value in the TLV as null to indicate that the DSCP field in the BIER packet header has been copied to the position of the Traffic Class field or other field of the outer IPv6 packet, and the original DSCP field in the BIER packet header may be used for other purposes.

That is, for pure intermediate nodes which are neither BFIR nor BFER, if these nodes perform load balancing processing only according to the Flow Label in the IPv6 header without considering the Entropy field in the BIER packet header, capability negotiation and announcement only needs to be performed between the BFIR and the BFER. The definition of the capability negotiation information may be embodied in the form of TLV, as shown in FIG. 4. For example, in the first manner, Type is set as 1, which represents "field definition change", Length is set as 1 byte, and Value is set as 1, which represents that the Entropy field is changed into the field for the service VPN label of the data packet. In the second manner, Type is set as 1, and Length is directly set as 0, with no Value followed, herein Type being 1 represents that the Entropy field is changed into the field for the service VPN Label of the data packet. Subsequently, when the definition of the DSCP field is also changed, for the first mode, Value may be set as 2 to represent the change of the definition of the DSCP field, and for the second mode, Type may be set as 2 to represent the change of the definition of the DSCP field.

For the DSCP field in the BIER packet header, similarly, after the value in the DSCP field is copied to the Traffic Class of the outer IPv6 header, the original DSCP field may be used to represent other content.

It should be noted that, the announcement of the TLV is performed along with protocol information interaction between the BFIR and the BFER, and protocols such as BGP, MVPN and MLD may be extended. For example, when the BFIR and the BFER use the BGP to perform data packet information interaction, the extended TLV may be announced together with the packet of the BGP. For another example, when the MLD is used to exchange data packet information between the BFIR and the BFER, the extended TLV may be announced together with the packet of the MLD.

When a Bit-Forwarding Router (BFR) device originally performs load balancing processing according to the Entropy field in the BIER packet header, the capability of field definition change of a node may be announced during flooding of information such as the BFR-ID of the BIER in protocols such as OSPF or ISIS. This solution avoids error in load balancing processing.

In an exemplary embodiment, the method may further include: the TLV is carried in at least one of following protocols between the BFIR and the BFER: a (Border Gateway Protocol) BGP, a Multicast Virtual Private Network (MVPN), and a Multicast Listener Discovery (MLD).

In an exemplary embodiment, after copying an Entropy field in a BIER packet header to a position of a Flow Label field of an outer IPv6 packet, and placing a label value allocated for VPN data in a position of the original Entropy field in the BIER packet header, the method may further include an operation of setting a reserved (RSV) bit of the BIER packet header as 1.

It can be understood that, when the BFIR and the BFER simultaneously support an encapsulation processing mode with field definition change and an encapsulation processing mode without field definition change, the true meaning of the Entropy field may not be recognized. In such a case, another bit (for example, a certain bit in the reserved bits (RSV bits)) in the BIER packet header may be used to represent that the definition of the Entropy field has been changed, for example, the low bit in the RSV bits may be set to 1 to indicate that the definition of the Entropy field has been changed. When the above solution is adopted, the encapsulation process of the BFIR will be added with the following operation: after the definition of the Entropy field is changed, the RSV is set as 1. In the decapsulation process of the BFER, the judgment on the RSV will be added, and if it is found that the corresponding bit is set to 1, it means that the definition of the Entropy field in the BIER packet header has already been changed, and thus the BFER may use the value in the Entropy field as the VPN label to perform the operation of retrieving the VPN table entry.

In an exemplary embodiment, the method may further include: in a case where a field definition change capability of any node in a network changes, other nodes in the network except the node are notified of the change in a protocol announcement manner, wherein the field definition change capability is used for indicating whether the node has a capability of copying the Entropy field in the BIER packet header to the position of the Flow Label field of the outer IPv6 packet, and placing the label value allocated for the VPN data in the position of the original Entropy field in the BIER packet header.

That is, when support for the field definition change capability changes, other nodes may be notified of the change in a protocol announcement manner. The notification may be implemented by capability re-announcement in which a special value is carried for indicating the change of the field definition change capability, for example, a new Type may be added or the Value may be set as a special value (full F) in the above capability TLV. Alternatively, the notification may be implemented by protocol basic information re-announcement, for example, re-announcement of supported address cluster for the BGP protocol without carrying the capability information anymore, so that other nodes become aware of this information. In this way, the BFIR node performs encapsulation according to an existing rule during encapsulation, and the BFR node may perform dynamic adjustment according to a situation of a next hop node, so as to avoid a packet processing error.

In order to facilitate better understanding of the above flow for processing the data packet, the above technical solutions will be described below in combination with exemplary embodiments which, however, are not intended to limit the technical solutions of the embodiments of the present disclosure.

Exemplary Embodiment 1

As shown in FIG. 5, the BIER domain uses a BIER packet transmission mechanism of IPv6 encapsulation, multicast data packets between the BFIR and the BFER are based on VPN1 or VPN2, and the BFIR allocates a label 10 to VPN1 and allocates a label 20 to VPN2.

An MVPN based on BGP is operated to exchange data packet information between the BFIR and the BFER, that is, when determining the BFERs where the receivers of certain traffic are located, field definition change capability is exchanged. Alternatively, it is also possible to announce the field definition change capability when the protocol session is initially established. If the BFIR supports the field definition change capability, the BFIR announces the field definition change capability, if the BFER supports the field definition change capability, the BFER announces the field definition change capability, and if the field definition change capability is not supported by the BFIR or the BFER, the BFIR or the BFER does not announce the field definition change capability.

It is assumed that BFER2 does not support the field definition change capability, BFER1 and BFER3 support the field definition change capability, and the BFIR finds that the field definition change processing cannot be performed for the traffic intended for the receivers including BFER2. In this embodiment, encapsulation processing with field definition change may be performed on the traffic of VPN2.

The processing flow of the BFIR for the data packet includes the following operations.

At 10, the BFIR receives the traffic from VPN2, and the corresponding BFER includes BFER1 and BFER3, and the value for load balancing, which is originally required to be encapsulated into the Entropy field in the BIER packet header, is encapsulated into the Flow Label field of the outer IPv6 header.

At 12, the BFIR encapsulates the label value 20 corresponding to VPN2 into the Entropy field of the BIER packet header.

At 14, since both BFER1 and BFER3 support the mode with field definition change and the mode without field definition change, for distinguishing, the BFIR sets the low bit of the RSV bits to 1, indicating that the definition of the Entropy field has been changed.

At 16, the BFIR directly appends the multicast data packet after the BIER packet header as the payload of the BIER packet, and directly assigns the type of the multicast data packet to the Proto field in the BIER packet header. For example, if the data packet is an IPv4 multicast data packet, the Proto field in the BIER packet header is directly set to the IPv4 type.

At 18, other fields in the BIER packet header and the IPv6 header are encapsulated according to an original rule.

The processing flow of the intermediate BFR device includes the following operations.

At 20, the intermediate BFR device performs load balancing processing according to the Flow Label field in the IPv6 header.

At 22, other processing and forwarding procedures are the same as existing rules.

The processing flow when the BFER receives the packet includes the following operations.

At 24, the BFER identifies the low bit of the RSV bits in the BIER packet header, and when the value of the low bit of the RSV bits is 1, the BFER knows that field definition change processing has been performed for the packet.

At 26, the BFER reads the value of the Entropy field, and searches for the corresponding VPN when the value is not 0. In this example, the value of the Entropy field is the label value 20, so the BFER finds the corresponding VPN2; if the value of the Entropy field is 0, the BFER searches in a global routing table.

At 28, the BFER directly searches the routing table in VPN2 according to the Proto value in the BIER packet header, and performs forwarding based on the found entry.

Exemplary Embodiment 2

When the capability supported by the node in the network changes, the current packet processing node can automatically adjust packet encapsulation according to the situation of the next-hop node, so as to avoid the situation that the node cannot process the packet correctly.

As shown in FIG. 5, it is assumed that the field definition change capability has been announced in the network, and the BFIR performs field definition change processing on all packets sent to the BFIR supporting the field definition change capability. As described in the embodiment, the BFIR learns, through protocol announcement, that both BFER1 and BFER3 support the field definition change capability, and normal encapsulation processing with field definition change is performed in the manner described in Exemplary Embodiment 1.

When BFER3 has a capability change due to configuration or other situation, for example, BFER3 cannot support the field definition change capability after being updated, and the BFIR cannot perform field definition change processing on the packet to be sent to BFER3. The specific operations are as follows.

At 30, the BFIR receives a capability cancellation packet from the BFIR, wherein the capability cancellation packet may be implemented by capability re-announcement in which a special value is carried for indicating the cancellation of the field definition change capability, for example, a new Type may be added or the Value may be set as a special value (full F) in the above capability TLV. Alternatively, the capability cancellation packet may be implemented by protocol basic information re-announcement without carrying the capability information anymore, so that other nodes become aware of this information.

At 32, the BFIR performs encapsulation and forwarding on the packet from VPN2 by using the existing encapsulation rule instead of using the encapsulation mode with field definition change. Alternatively, the encapsulation mode with field definition change is still adopted for BFER1, while the existing encapsulation rule is adopted for BFER3 for encapsulation and forwarding.

For the processing of the BFR node, the following operations may be optionally supported.

In a case of learning that BFER3 no longer supports the field definition change function, when receiving a packet with field definition change and needing to be sent to BFER3, BFRn node in FIG. 5 executes the following processing operations.

At 40, BFRn receives the packet, and after normal load balancing processing is performed according to the Flow Label in the IPv6 header, reads the low bit field of the RSV bits in the BIER packet header, and finds that the low bit has been set as 1.

At 42, BFRn re-adjusts and encapsulates the packet, for example, BFRn sets the Proto field in the BIER packet header as MPLS, inserts a label, the value of which is obtained from the original Entropy field of the BIER packet header, into the BIER packet header and the subsequent data packet, and sets the RSV bit as 0. The encapsulated packet is similar to that in FIG. 6, that is, the field for which the definition has been changed is restored according to the original rule.

At 44, BFRn forwards the re-encapsulated packet to BFER3.

When receiving the packet, BFER3 performs processing according to a normal processing rule, and a packet processing error will not occur.

By means of the described technical solution, the exemplary embodiments of the present disclosure provide a new packet encapsulation manner, which combines BIER encapsulation with IPv6 encapsulation, changes the definition of a part of fields, and in conjunction with capability negotiation of a control plane, optimizes an encapsulation and processing flow of a service packet without affecting any function, thereby improving encapsulation and processing efficiency, and facilitating further optimization of the BIER technology. The solution uses fields in the outer IPv6 header, changes the definition of the fields in the BIER packet header without affecting the implementation of the functions, and achieves negotiation by virtue of capability announcement. Thus, service carrying and packet encapsulation are optimized, and processing speed is improved.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a more suggested implementation. Based on such understanding, the essence of the technical solutions of the embodiments of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

The embodiments also provide a device for processing a data packet, which is configured to implement the described embodiments and exemplary implementations, and what has been described will not be elaborated. As used below, the term "module" refers to a combination of software and/or hardware that may implement a predetermined function.

Although the device described in the following embodiments is preferably implemented by software, implementation of hardware or a combination of software and hardware is also possible and conceived.

Figure 7:
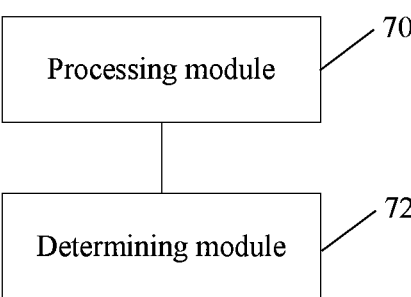
FIG. 7 is a schematic structural diagram of a device for processing a data packet according to the embodiments of the present disclosure.

FIG. 7 is a schematic structural diagram of a device for processing a data packet according to the embodiments of the present disclosure. As shown in FIG. 7, the device includes a processing module 70 and a setting module 72.

The processing module 70 is configured to, in a case where a BFIR performs BIER packet encapsulation and outer IPv6 packet encapsulation on a data packet, copy an Entropy field in a BIER packet header to a position of a Flow Label field of an outer IPv6 packet, and place a label value allocated for VPN data in a position of the original Entropy field in the BIER packet header.

The setting module 72 is configured to set a data packet after the BIER packet header, and set a Proto field in the BIER packet header to a corresponding value indicating a data packet type of the data packet, wherein the data packet type at least includes one of: an IPv4 packet, an IPv6 packet, an Ethernet packet, an MPLS packet and an OAM packet.

By means of the embodiments of the present disclosure, the following processing can be performed on a BIER packet and an IPv6 packet: copying an Entropy field in a BIER packet header to a position of a Flow Label field of an outer IPv6 packet, and placing a label value allocated for VPN data in a position of the original Entropy field in the BIER packet header; and setting a data packet after the BIER packet header, and setting a Proto field in the BIER packet header to a corresponding value indicating a data packet type of the data packet, so that the BIER packet is encapsulated in an IPv6 packet. By means of the technical solution, the problems in the related art that a BIER packet cannot be effectively optimized in an IPv6 packet are solved.

By applying the described technical solution, as shown in FIG. 3, in this case, even for a service based on a VPN, the Proto field is no longer set as an MPLS type, but is directly set as the real type of the data packet, that is, IPv4, IPv6, Ethernet, MPLS or OAM, etc.

In an exemplary embodiment, the processing module 70 is further configured to, when a device that needs to process the data packet performs forwarding processing on the data packet, perform load balancing processing only according to the Flow Label field in the IPv6 packet header. It can be understood that when forwarding processing is performed on devices along the route, load balancing processing is performed only according to the Flow Label field in the IPv6 packet header, in other words, the load balancing processing is no longer performed according to the Entropy field in the BIER packet header.

In an exemplary embodiment, the processing module 70 is further configured to, when a Bit-Forwarding Egress Router (BFER) receives the data packet, remove the outer IPv6 packet header from the data packet, and search for a VPN corresponding to the label value according to the label value in the original Entropy field in the BIER packet header; and perform forwarding processing on the data packet according to the data packet type indicated in the Proto field. That is, in the embodiment of the present disclosure, when receiving the packet, the BFER removes the outer IPv6 header, finds the corresponding VPN according to the original Entropy field (which is now the Label field) in the BIER packet header, and then directly reads and forwards the subsequent data packet according to the indication of the Proto field. Assuming that the Proto field indicates IPv4, the BFER performs IPv4 routing table lookup processing in a corresponding VPN, and forwards the data packet to a correct receiver.

It should be noted that, the value of Entropy being 0 may indicate a global multicast, that is, the VPN is 0 or there is no VPN, and in this case, the corresponding global routing table may be searched according to the Proto field.

Concerning field definition change processing for packets at the BFIR and the BFER, if the devices all support and only support the field definition change processing, such a parsing method is adopted as long as the BIER packet is encapsulated into the IPv6 header, and no other control means is required. However, some devices deployed in the network may not support the field definition change processing, and therefore there may be a case where both of the field definition change processing and normal processing are supported. In this case, a control plane needs to be extended, for example, in the following manner.

In an exemplary embodiment, for a pure intermediate node which is neither a BFIR nor a BFER, in a case where the intermediate node performs load balancing processing only according to the Flow Label in the IPv6 packet header, the processing module 70 is configured to perform a processing procedure of capability negotiation and announcement between the BFIR and the BFER.

In an exemplary embodiment, capability negotiation information in the processing procedure of capability negotiation and announcement is defined in a form of Type Length and Value (TLV).

In an exemplary embodiment, the operation that the capability negotiation information in the processing procedure of capability negotiation and announcement is defined in the form of TLV may at least include one of: setting Type in the TLV as 1, Length in the TLV as 1 byte, and Value in the TLV as 1 to indicate that the Entropy field in the BIER packet header has been copied to the position of the Flow Label field of the outer IPv6 packet and the label value allocated for the VPN data has been placed in the position of the original Entropy field in the BIER packet header; or setting Type in the TLV as 1, Length in the TLV as 0, and Value in the TLV as null to indicate that the Entropy field in the BIER packet header has been copied to the position of the Flow Label field of the outer IPv6 packet and the label value allocated for the VPN data has been placed in the position of the original Entropy field in the BIER packet header.

In an exemplary embodiment, by setting Type in the TLV as 2, Length in the TLV as 1 byte, and Value in the TLV as 1, it can be indicated that a Differentiated Services Code Point (DSCP) field in the BIER packet header has been copied to a position of a Traffic Class field or other field of the outer IPv6 packet, and the original DSCP field in the BIER packet header may be used for other purposes. Alternatively, by setting Type in the TLV as 2, Length in the TLV as 0, and Value in the TLV as null, it can be indicated that the DSCP field in the BIER packet header has been copied to the position of the Traffic Class field or other field of the outer IPv6 packet, and the original DSCP field in the BIER packet header may be used for other purposes.

That is, for pure intermediate nodes which are neither BFIR nor BFER, if these nodes perform load balancing processing only according to the Flow Label in the IPv6 header without considering the Entropy field in the BIER packet header, capability negotiation and announcement only needs to be performed between the BFIR and the BFER. The definition of the capability negotiation information may be embodied in the form of TLV, as shown in FIG. 4. For example, in the first manner, Type is set as 1, which represents "field definition change", Length is set as 1 byte, and Value is set as 1, which represents that the Entropy field is changed into the field for the service VPN label of the data packet. In the second manner, Type is set as 1, and Length is directly set as 0, with no Value followed, herein Type being 1 represents that the Entropy field is changed into the field for the service VPN Label of the data packet. Subsequently, when the definition of the DSCP field is also changed, for the first mode, Value may be set as 2 to represent the change of the definition of the DSCP field, and for the second mode, Type may be set as 2 to represent the change of the definition of the DSCP field.

For the DSCP field in the BIER packet header, similarly, after the value in the DSCP field is copied to the Traffic Class of the outer IPv6 header, the original DSCP field may be used to represent other content.

It should be noted that, the announcement of the TLV is performed along with protocol information interaction between the BFIR and the BFER, and protocols such as BGP, MVPN and MLD may be extended. For example, when the BFIR and the BFER use the BGP to perform data packet information interaction, the extended TLV may be announced together with the packet of the BGP. For another example, when the MLD is used to exchange data packet information between the BFIR and the BFER, the extended TLV may be announced together with the packet of the MLD.

When a Bit-Forwarding Router (BFR) device originally performs load balancing processing according to the Entropy field in the BIER packet header, the capability of field definition change of a node may be announced during flooding of information such as the BFR-ID of the BIER in protocols such as OSPF or ISIS. This solution avoids error in load balancing processing.

In an exemplary embodiment, the TLV is carried in at least one of following protocols between the BFIR and the BFER: a (Border Gateway Protocol) BGP, a Multicast Virtual Private Network (MVPN), and a Multicast Listener Discovery (MLD).

In an exemplary embodiment, after copying an Entropy field in a BIER packet header to a position of a Flow Label field of an outer IPv6 packet, and placing a label value allocated for VPN data in a position of the original Entropy field in the BIER packet header, a reserved (RSV) bit of the BIER packet header is set as 1.

It can be understood that, when the BFIR and the BFER simultaneously support an encapsulation processing mode with field definition change and an encapsulation processing mode without field definition change, the true meaning of the Entropy field may not be recognized. In such a case, another bit (for example, a certain bit in the reserved bits (RSV bits)) in the BIER packet header may be used to represent that the definition of the Entropy field has been changed, for example, the low bit in the RSV bits may be set to 1 to indicate that the definition of the Entropy field has been changed. When the above solution is adopted, the encapsulation process of the BFIR will be added with the following operation: after the definition of the Entropy field is changed, the RSV is set as 1. In the decapsulation process of the BFER, the judgment on the RSV will be added, and if it is found that the corresponding bit is set to 1, it means that the definition of the Entropy field in the BIER packet header has already been changed, and thus the BFER may use the value in the Entropy field as the VPN label to perform the operation of retrieving the VPN table entry.

In an exemplary embodiment, in a case where a field definition change capability of any node in a network changes, other nodes in the network except the node are notified of the change in a protocol announcement manner, wherein the field definition change capability is used for indicating whether the node has a capability of copying the Entropy field in the BIER packet header to the position of the Flow Label field of the outer IPv6 packet, and placing the label value allocated for the VPN data in the position of the original Entropy field in the BIER packet header That is, when support for the field definition change capability changes, other nodes may be notified of the change in a protocol announcement manner. The notification may be implemented by capability re-announcement in which a special value is carried for indicating the change of the field definition change capability, for example, a new Type may be added or the Value may be set as a special value (full F) in the above capability TLV. Alternatively, the notification may be implemented by protocol basic information re-announcement, for example, re-announcement of supported address cluster for the BGP protocol without carrying the capability information anymore, so that other nodes become aware of this information. In this way, the BFIR node performs encapsulation according to an existing rule during encapsulation, and the BFR node may perform dynamic adjustment according to a situation of a next hop node, so as to avoid a packet processing error.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, wherein the computer program is configured to execute the operations in any one of the described method embodiments at runtime.

In an exemplary embodiment, the computer-readable storage medium may include, but is not limited to, any medium that is able to store a computer program, such as a U disk, a Read-Only Memory (ROM), a Random Access Memory (RAM), a mobile hard disk, a magnetic disk, or an optical disk.

The embodiments of the present disclosure also provide an electronic device, including a memory and a processor. The memory stores a computer program. The processor is configured to run the computer program to execute operations in any one of the method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the embodiments of the present disclosure may be implemented by a universal computing device. The modules or operations may be concentrated on a single computing device or distributed on a network formed by a plurality of computing devices, and may be implemented by program codes executable for the computing devices, so that the modules or operations may be stored in a storage device for execution with the computing devices. The shown or described operations may be executed in sequences different from those described here in some cases, or may form each integrated circuit module respectively, or multiple modules or operations therein may form a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection defined by the appended set of claims of the present disclosure.

What is claimed is:

1. A method for processing a data packet, comprising:

in a case where a Bit-Forwarding Ingress Router (BFIR) performs Bit Index Explicit Replication (BIER) packet encapsulation and outer Internet Protocol Version 6 (IPv6) packet encapsulation on a data packet, copying an Entropy field in a BIER packet header to a position of a Flow Label field of an outer IPV6 packet, and placing a label value allocated for Virtual Private Network (VPN) data in a position of the original Entropy field in the BIER packet header; and setting the data packet after the BIER packet header, setting a Proto field in the BIER packet header to a corresponding value indicating a data packet type of the data packet, and transmitting the encapsulated data packet, wherein the data packet type at least comprises one of: an Internet Protocol Version 4 (IPv4) packet, an IPV6 packet, an Ethernet packet, a Multi-Protocol Label Switching (MPLS) packet and an Operation Administration and Maintenance (OAM) packet;

further comprising:

when receiving the data packet, removing, by a Bit-Forwarding Egress Router (BFER), the outer IPV6 packet header from the data packet, and searching, by the BFER, for a VPN corresponding to the label value in the original Entropy field in the BIER packet header; and searching a routing table corresponding to the found VPN according to the Proto value in the BIER packet header of the received data packet, and performing forwarding based on the found entry; and further comprising:

for a pure intermediate node which is neither a BFIR nor a BFER, in a case where the intermediate node performs load balancing processing only according to the Flow Label in the IPV6 packet header, performing a processing procedure of capability negotiation and announcement between the BFIR and the BFER, and defining capability negotiation information in the processing procedure of capability negotiation and announcement in a form of Type Length and Value (TLV), wherein defining the capability negotiation information in the processing procedure of capability negotiation and announcement in the form of TLV at least comprises one of: setting Type in the TLV as 1, Length in the TLV as 1 byte, and Value in the TLV as 1 to indicate that the Entropy field in the BIER packet header has been copied to the position of the Flow Label field of the outer IPV6 packet and the label value allocated for the VPN data has been placed in the position of the original Entropy field in the BIER packet header; or setting Type in the TLV as 1, Length in the TLV as 0, and Value in the TLV as null to indicate that the Entropy field in the BIER packet header has been copied to the position of the Flow Label field of the outer IPV6 packet and the label value allocated for the VPN data has been placed in the position of the original Entropy field in the BIER packet header; or further comprising one of: setting Type in the TLV as 2, Length in the TLV as 1 byte, and Value in the TLV as 1 to indicate that a Differentiated Services Code Point (DSCP) field in the BIER packet header has been copied to a position of a Traffic Class field or other field of the outer IPV6 packet; or setting Type in the TLV as 2, Length in the TLV as 0, and Value in the TLV as null to indicate that the DSCP field in the BIER packet header has been copied to the position of the Traffic Class field or other field of the outer IPV6 packet.

2. The method according to claim 1, after copying an Entropy field in a BIER packet header to a position of a Flow Label field of an outer IPV6 packet, the method further comprising:

when performing forwarding on the data packet, performing, by a device that needs to process the data packet, load balancing processing only according to the Flow Label field in the IPV6 packet header.

3. The method according to claim 1, further comprising:

carrying the TLV in at least one of following protocols between the BFIR and the BFER:

a (Border Gateway Protocol) BGP, a Multicast Virtual Private Network (MVPN), and a Multicast Listener Discovery (MLD).

4. The method according to claim 1, after copying an Entropy field in a BIER packet header to a position of a Flow Label field of an outer IPv6 packet, and placing a label value allocated for VPN data in a position of the original Entropy field in the BIER packet header, the method further comprising:

setting a reserved (RSV) bit of the BIER packet header as 1.

5. The method according to claim 1, further comprising:

in a case where a field definition change capability of any node in a network changes, notifying other nodes in the network except the node in a protocol announcement manner, wherein the field definition change capability is used for indicating whether the node has a capability of copying the Entropy field in the BIER packet header to the position of the Flow Label field of the outer IPV6 packet, and placing the label value allocated for the VPN data in the position of the original Entropy field in the BIER packet header.

6. A non-transitory computer-readable storage medium storing a computer program, wherein the computer program, when being executed, is configured to execute following operations:

in a case where a Bit-Forwarding Ingress Router (BFIR) performs Bit Index Explicit Replication (BIER) packet encapsulation and outer Internet Protocol Version 6 (IPv6) packet encapsulation on a data packet, copying an Entropy field in a BIER packet header to a position of a Flow Label field of an outer IPV6 packet, and placing a label value allocated for Virtual Private Network (VPN) data in a position of the original Entropy field in the BIER packet header; and setting the data packet after the BIER packet header, setting a Proto field in the BIER packet header to a corresponding value indicating a data packet type of the data packet, and transmitting the encapsulated data packet, wherein the data packet type at least comprises one of: an Internet Protocol Version 4 (IPv4) packet, an IPV6 packet, an Ethernet packet, a Multi-Protocol Label Switching (MPLS) packet and an Operation Administration and Maintenance (OAM) packet;

wherein the computer program, when being executed, is further configured to execute following operations:

when receiving the data packet, removing, by a Bit-Forwarding Egress Router (BFER), the outer IPV6 packet header from the data packet, and searching, by the BFER, for a VPN corresponding to the label value in the original Entropy field in the BIER packet header; and searching a routing table corresponding to the found VPN according to the Proto value in the BIER packet header of the received data packet, and performing forwarding based on the found entry; and wherein the computer program, when being executed, is further configured to execute following operations:

for a pure intermediate node which is neither a BFIR nor a BFER, in a case where the intermediate node performs load balancing processing only according to the Flow Label in the IPV6 packet header, performing a processing procedure of capability negotiation and announcement between the BFIR and the BFER, and defining capability negotiation information in the processing procedure of capability negotiation and announcement in a form of Type Length and Value (TLV), wherein defining the capability negotiation information in the processing procedure of capability negotiation and announcement in the form of TLV at least comprises one of: setting Type in the TLV as 1, Length in the TLV as 1 byte, and Value in the TLV as 1 to indicate that the Entropy field in the BIER packet header has been copied to the position of the Flow Label field of the outer IPV6 packet and the label value allocated for the VPN data has been placed in the position of the original Entropy field in the BIER packet header; or setting Type in the TLV as 1, Length in the TLV as 0, and Value in the TLV as null to indicate that the Entropy field in the BIER packet header has been copied to the position of the Flow Label field of the outer IPV6 packet and the label value allocated for the VPN data has been placed in the position of the original Entropy field in the BIER packet header;

or, wherein the computer program, when being executed, is further configured to execute one of following operations: setting Type in the TLV as 2, Length in the TLV as 1 byte, and Value in the TLV as 1 to indicate that a Differentiated Services Code Point (DSCP) field in the BIER packet header has been copied to a position of a Traffic Class field or other field of the outer IPV6 packet; or setting Type in the TLV as 2, Length in the TLV as 0, and Value in the TLV as null to indicate that the DSCP field in the BIER packet header has been copied to the position of the Traffic Class field or other field of the outer IPV6 packet.

7. A system for processing a data packet, comprising:

a Bit-Forwarding Ingress Router (BFIR) and a Bit-Forwarding Egress Router (BFER), wherein the BFIR is configured to perform the following operations:

in a case where the BFIR performs Bit Index Explicit Replication (BIER) packet encapsulation and outer Internet Protocol Version 6 (IPv6) packet encapsulation on a data packet, copying an Entropy field in a BIER packet header to a position of a Flow Label field of an outer IPV6 packet, and placing a label value allocated for Virtual Private Network (VPN) data in a position of the original Entropy field in the BIER packet header; and setting the data packet after the BIER packet header, setting a Proto field in the BIER packet header to a corresponding value indicating a data packet type of the data packet, and transmitting the encapsulated data packet, wherein the data packet type at least comprises one of: an Internet Protocol Version 4 (IPv4) packet, an IPV6 packet, an Ethernet packet, a Multi-Protocol Label Switching (MPLS) packet and an Operation Administration and Maintenance (OAM) packet; and wherein the BFER is configured to perform the following operations:

when receiving the data packet, removing the outer IPv6 packet header from the data packet, and searching for a VPN corresponding to the label value in the original Entropy field in the BIER packet header; and searching a routing table corresponding to the found VPN according to the Proto value in the BIER packet header of the received data packet, and performing forwarding based on the found entry; and the system further comprising a pure intermediate node which is neither a BFIR nor a BFER, wherein the pure intermediate node is further configured to perform following operations: in a case where the intermediate node performs load balancing processing only according to the Flow Label in the IPV6 packet header, performing a processing procedure of capability negotiation and announcement between the BFIR and the BFER, wherein capability negotiation information in the processing procedure of capability negotiation and announcement is defined in a form of Type Length and Value (TLV), wherein Type in the TLV is set as 1, Length in the TLV is set as 1 byte, and Value in the TLV is set as 1 to indicate that the Entropy field in the BIER packet header has been copied to the position of the Flow Label field of the outer IPV6 packet and the label value allocated for the VPN data has been placed in the position of the original Entropy field in the BIER packet header; or Type in the TLV is set as 1, Length in the TLV is set as 0, and Value in the TLV is set as null to indicate that the Entropy field in the BIER packet header has been copied to the position of the Flow Label field of the outer IPV6 packet and the label value allocated for the VPN data has been placed in the position of the original Entropy field in the BIER packet header;

or, wherein Type in the TLV is set as 2, Length in the TLV is set as 1 byte, and Value in the TLV is set as 1 to indicate that a Differentiated Services Code Point (DSCP) field in the BIER packet header has been copied to a position of a Traffic Class field or other field of the outer IPV6 packet; or Type in the TLV is set as 2, Length in the TLV is set as 0, and Value in the TLV is set as null to indicate that the DSCP field in the BIER packet header has been copied to the position of the Traffic Class field or other field of the outer IPv6 packet.

8. The system according to claim 7, further comprising a pure intermediate node or a Bit-Forwarding Egress Router (BFER), wherein the pure intermediate node or the BFER is configured to perform following operations after receiving the data packet:

when performing forwarding on the data packet, performing, by a device that needs to process the data packet, load balancing processing only according to the Flow Label field in the IPV6 packet header.

9. The system according to claim 7, wherein the TLV is carried in at least one of following protocols between the BFIR and the BFER: a (Border Gateway Protocol) BGP, a Multicast Virtual Private Network (MVPN), and a Multicast Listener Discovery (MLD).

10. The system according to claim 7, wherein the BFIR is configured to perform following operations after copying an Entropy field in a BIER packet header to a position of a Flow Label field of an outer IPV6 packet, and placing a label value allocated for VPN data in a position of the original Entropy field in the BIER packet header:

setting a reserved (RSV) bit of the BIER packet header as 1.

* * * * *